United States Patent
Blackburn (10) Patent No.: US 6,556,638 B1
(45) Date of Patent: Apr. 29, 2003

(54) METHOD AND APPARATUS FOR PROVIDING INCREASED DATA SPEED USING SYNCHRONIZATION AND BIT ROBBING TECHNIQUES

(75) Inventor: Thomas L. Blackburn, San Jose, CA (US)

(73) Assignee: Godigital Networks Corporation, Fremont, CA (US)

(*) Notice: Subject to any disclaimer, the term of this patent is extended or adjusted under 35 U.S.C. 154(b) by 0 days.

(21) Appl. No.: 09/510,420

(22) Filed: Feb. 22, 2000

Related U.S. Application Data (60) Provisional application No. 60/121,078, filed on Feb. 22, 1999.

(51) Int. Cl.[7] .................................................. H04L 7/00
(52) U.S. Cl. ........................ 375/354; 375/222; 375/356; 370/235; 370/523
(58) Field of Search ..................................... 375/354, 219, 375/220, 222, 356, 242, 243, 350; 370/230, 235, 236, 357, 386, 398, 422, 503, 505, 509, 522, 523; 379/399.02, 402, 387.02, 398, 377, 93.01, 91.01, 93.06

(56) References Cited

U.S. PATENT DOCUMENTS

| | | | | |
|---|---|---|---|---|
| 5,301,187 A | * | 4/1994 | Reum .......................... | 370/276 |
| 5,422,950 A | * | 6/1995 | Miller et al. ................. | 379/340 |
| 5,729,226 A | * | 3/1998 | Betts et al. .................... | 341/94 |
| 6,052,412 A | | 4/2000 | Ruether et al. | |
| 6,151,364 A | * | 11/2000 | Ruether et al. .............. | 375/222 |
| 6,169,801 B1 | * | 1/2001 | Levasseur et al. ........... | 370/279 |
| 6,236,677 B1 | * | 5/2001 | Hsieh .......................... | 375/220 |
| 6,243,372 B1 | * | 6/2001 | Petch et al. .................. | 370/324 |
| 6,327,666 B1 | * | 12/2001 | Langberg et al. ........... | 713/400 |
| RE37,569 E | * | 3/2002 | Ayanoglu et al. ........... | 341/144 |

\* cited by examiner

*Primary Examiner*—Chi Pham
*Assistant Examiner*—Khanh Tran
(74) *Attorney, Agent, or Firm*—Sierra Patent Group, Ltd.

(57) ABSTRACT

Method and apparatus for transmitting encoded signals with increased data speed in communications system using system clock synchronization and bit robbing techniques to attain high transmission rates is provided.

21 Claims, 4 Drawing Sheets

METHOD AND APPARATUS FOR PROVIDING INCREASED DATA SPEED USING SYNCHRONIZATION AND BIT ROBBING TECHNIQUES

PRIORITY CLAIM UNDER 35 USC §119

This application claims priority to provisional application No. 60/121,078 filed Feb. 22, 1999 under 35 USC §119.

BACKGROUND OF THE INVENTION

1. Field of the Invention

The present invention is related to a communication system for transmitting voice and/or data signals. In particular, the present invention relates to method and apparatus for increasing the signal transmission speed in modem communications systems using synchronization and bit robbing techniques.

2. Description of the Related Art

Traditional modem standards assume that both ends of a modem session have an analog session to the public switched telephone network. Data signals are converted from digital to analog and back again, thus limiting transmission speeds to 33.6 Kbps with V.34 modems. Further, due to limitations of the public switched telephone network, the theoretical maximum transmission speed is approximately 35 Kbps.

The V.90 technology approaches data transmission in a different manner—that one end of the modem session has a pure digital connection to the phone network and takes advantage of that high speed digital connection. Indeed, by viewing the public switched telephone network as a digital network, V.90 technology is able to accelerate data downstream from the Internet to end user's computer at speeds of up to 56 Kbps. It should be noted, however, that due to existing regulations on maximum permissible power levels during download transmissions, while the V.90 modems can receive data at speeds of up to 56 Kbps, in practice, the actual maximum speed is limited to 54 Kbps.

Data speeds approaching the ideal speed of 56 Kbps can be delivered downstream to the Customer Premise Equipment (CPE) using encoding schemes such as 128 Pulse Amplitude Modulation (PAM). Presently available CPE equipment can be configured to decode the 128 PAM encoding scheme and achieve data speeds approaching 56 Kbps. However, there are several factors that may reduce this transmission rate. For example, to achieve as close to the ideal data transmission speed of 56 Kbps, the connections from the Internet Service Provider (ISP) must be in the form of digital transmission, the analog phone line from the switch to the CPE must have a satisfactory signal-to-noise (S/N) ratio, and there must be no additional analog-to-digital (A/D) conversions between the Central Office (CO) switch and the CPE. The switch referred to herein is provided as the connection between the telephone company interface to the customer via a port on a switch network such as the 5ESS (#5 Electronic Switching System). This port can be analog or digital, and for plain old telephone service (POTS) system, it is generally analog. This switch connects the analog port to other analog ports or to digital devices such as a T1 line for routing the signals carried thereon to other offices.

For example, in the case of a communications system requiring additional A/D conversions, by virtue of the additional A/D conversions required in the system, the data transmission speed is reduced to a rate below 30 Kbps. More specifically, Shannon's theorem provides that because of quantization noise introduced by the additional A/D conversions in the communication systems, the ideal data transmission speed of 56 Kbps is limited to the theoretical speed of 33.6 Kbps due to the sampling rate and the noise floor of the conversion process as mandated by Shannon's theorem for an 8 bit A/D converter used in telecommunications devices. In particular, the 33.6 Kbps limit occurs because the incoming analog signal which contains the encoded digital data as quantization steps on the waveform cannot be accurately recovered and transmitted transparently over the intermediate digital link. Further detail regarding Shannon's theorem can be found in 56 Kbps Data Transmission across the PSTN, available as of Oct. 14, 1998 at the following URL:

http://www.conexant.com/pressroom/whitepapers (Oct. 14, 1998).

Figure 1:
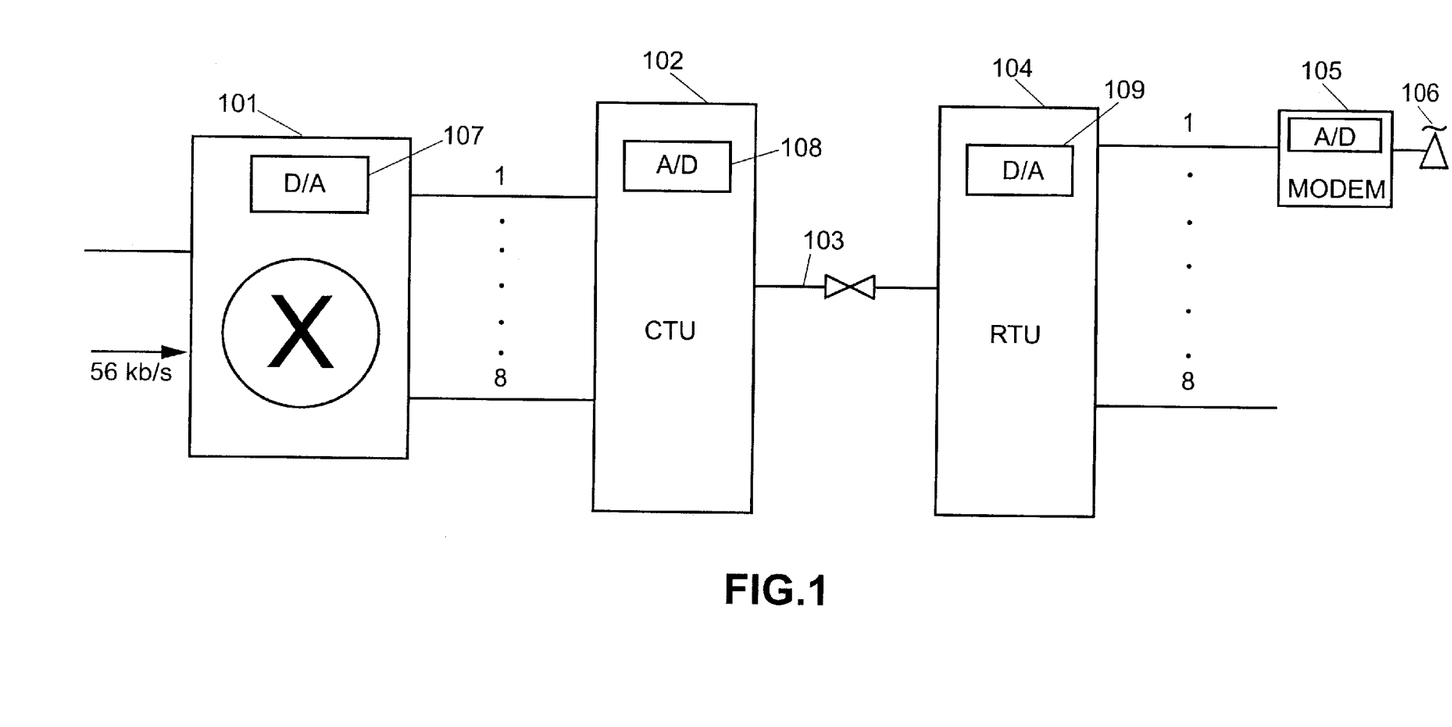
FIG. 1 illustrates an eight line copper fed subscriber carrier system.

FIG. 1 illustrates an eight line copper fed subscriber carrier system available from GoDigital Networks Corporation of Fremont Calif., the assignee of the present invention, a detailed description of which is provided in an application entitled Multiple Digital Subscriber Carrier With Drop and Insert Repeater System concurrently filed herein which claims priority under 35 USC §119 to provisional application No. 60/121,011 filed on Feb. 22, 1999, the disclosures of each of which are incorporated in its entirety herein by reference.

As shown, a Central Office switch 101 located at the Central Office Site receives an incoming digital signal transmitted at a rate of 56 Kbps from an Internet Service Provider (ISP). The Central Office switch, among others, decodes the digital signal received from the ISP using a standard commercially available digital-toanalog (D/A) converter such as the D/A converter 107 shown in FIG. 1, and transmits the decoded signal to the Central Office Terminal Unit (CTU) 102 of the subscriber line carrier system for each of the eight channels shown in FIG. 1. Each of the decoded signals received at the CTU 102 from each of the eight channels is then encoded using an analog-to-digital (A/D) converter 108 in the CTU 102.

The digitized signal is then transmitted from the CTU 102 to a Remote Terminal Unit (RTU) 104 via a single bi-directional twisted copper pair 103. At the RTU 104, the reverse process as that in the CTU 102 is performed. In other words, the received digital signal is decoded by a D/A converter 109 at the RTU 104, and each of the decoded signals are transmitted to the respectively linked subscriber line to user remote terminals. For example, the decoded signals from the RTU 104 may be provided to a 56 Kbps modem 105 which is further coupled to a telephone line or a computer 106 located at a user's residence or office.

In the system described above and shown in FIG. 1, as previously discussed, because of the quantization noise introduced by the additional A/D conversion at the Central Office Terminal Unit 102 in the subscriber loop between the Central Office switch 101 and the Customer Premise Equipment (CPE) including the 56 Kbps modem 105 and the telephone or the computer 106 located at the user's site, the transmission speed is limited to at most 33.6 Kbps. More specifically, the resulting limitation on the signal (or data) transmission speed is due to the sampling data and the noise floor of the conversion process.

Presently, there are no known economical approaches to increase the data transmission speed when passing the encoded data through an additional A/D conversion process at the communications equipment between the Central Office switch and the CPE as discussed above.

Presently available 56K modems from U.S. Robotics, for example, which can be used at the CPE implements digital signal processing (DSP) techniques to recover the network clock, can also provide compensation for the deterioration in the analog loop characteristics (such as signal level and phase) between the Central Office switch and the CPE up to a distance of 12 Kft of the twisted copper pair and any digital or analog pads which may be located in the signal transmission path. The digital or analog pads (depending upon its location in the network) refer to lossy elements that are inserted into the telephone network to reduce signal levels. These pads are generally used to reduce the possibility of poor balance (i.e., the hybrid balance at a 4W to 2W point) and can result in noisy data transmission. For example, in a digital system, a T1 is a 4-wire (4W) system and when this digital signal is converted to an analog signal at the CO switch 101, it passes through a 4W–2W (2-wire) hybrid as required to place the signal on a 2 wire circuit.

However, for pair gain systems using multiple voice channels over a single twisted copper cable pair, the approach set forth above for each transmission line would be cost prohibitive due to the requirement for the eight channels, for example, in the eight line copper fed subscriber carrier system, to be provided with a customized digital signal processor (DSP) and a unique 16 bit A/D converter suitable for use with all eight subscriber lines. Alternatively, each subscriber line can be provided with a separate dedicated DSP, but this would significantly increase the cost of the system.

Typically, the additional A/D conversion process occurs in close proximity to the CO switch (for example, within 100 ft from the CO switch). Further, due to this proximity, the signal loss and phase variation is minimal between these two points. With a cost effective approach to recover the encoded digital data from the incoming analog signal, the data transmission speed can be increased above the theoretical limit of 33.6 Kbps since additional introduction of quantization noise can be avoided. Therefore, a cost effective system which can provide an increase in signal transmission speed above the 33.6 Kbps transmission rate with an additional A/D conversion process in the loop is desirable.

SUMMARY OF THE INVENTION

In view of the foregoing, in accordance with the present invention, there are provided method and apparatus for providing a cost effective voice and/or data communications system with high transmission speed exceeding the 33.6 Kbps rate of the modems in communications systems with the use of synchronization and/or bit robbing techniques.

In particular, in accordance with one embodiment of the present invention, there is provided a communication system, comprising: a codec interface for encoding an analog signal received a central office switch and generating a digital signal; a clock configured to receive a network clock signal from the central office switch and to generate a master clock signal, wherein the master clock signal is synchronized to the network clock signal; and a framer coupled to the codec interface for receiving the digital signal from the codec interface, the framer further coupled to the clock for receiving the synchronized master clock signal; wherein the codec interface is configured to encode the analog signal in accordance with the synchronized master clock signal.

In accordance with another embodiment of the present invention, there is provided a communication system, comprising: a codec interface for encoding an analog signal to generate an encoded digital signal; a clock configured to receive a network clock signal from a central office switch and to generate a master clock signal, wherein the master clock signal is synchronized to the network clock signal; and a framer coupled to the codec interface for receiving the encoded digital signal, and coupled to the clock for receiving the synchronized master clock signal, wherein the framer further includes: a first register for storing the encoded digital signal; a second register for storing signaling information; a transmit buffer for temporarily storing a first portion of the encoded digital signal; an overhead buffer for temporarily storing either a second portion of the encoded digital signal or the signaling information; and a framer clock for synchronizing the first and second registers, the transmit buffer and the overhead buffer to the synchronized master clock signal; wherein when there is no signaling information change in the second register, the first portion of the encoded digital signal is multiplexed with the second portion of the encoded digital signal, and further, when there is signaling information change in the second register, the first portion of the encoded digital signal is multiplexed with the signaling information.

In accordance with yet another embodiment of the present invention, there is provided a method of providing a communication system, comprising the steps of: encoding an analog signal and generating a digital signal; receiving a network clock signal and generating a master clock signal; synchronizing the master clock signal to the network clock signal; and receiving the digital signal generated at the encoding step and the synchronized master clock signal; wherein the step of encoding includes encoding the analog signal in accordance with the synchronized master clock signal.

In accordance with still yet another embodiment of the present invention, there is provided a method of providing a communication system, comprising the steps of: encoding an analog signal and generating an encoded digital signal; receiving a network clock signal and generating a master clock signal, wherein the master clock signal is synchronized to the network clock signal; latching the encoded digital signal in a first register; latching signaling information in a second register; temporarily storing a first portion of the encoded digital signal in a first buffer; temporarily storing either a second portion of the encoded digital signal or the signaling information in a second buffer; synchronizing the first and second registers and the first and second buffers with the synchronized master clock signal; wherein when there is no signaling information change in the second register, multiplexing the first portion of the encoded digital signal with the second portion of the encoded digital signal, and further, when there is signaling information change in the second register, multiplexing the first portion of the encoded digital signal with the signaling information.

These and other features and advantages of the present invention will be understood upon consideration of the following detailed description of the invention and the accompanying drawings.

DESCRIPTION OF THE PREFERRED EMBODIMENT

Figure 2:
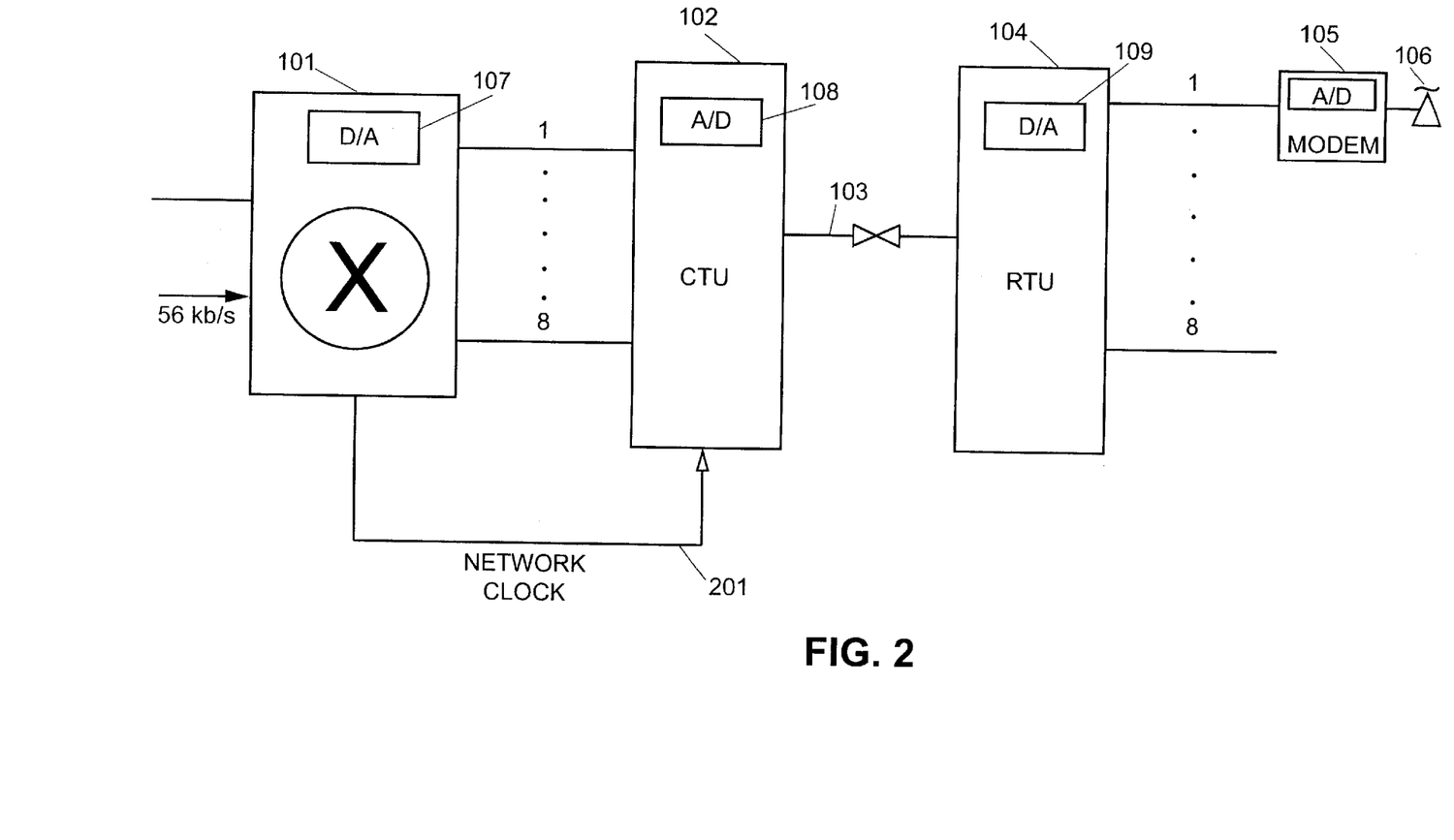
FIG. 2 illustrates a signal transmission system with increased data speed in accordance with one embodiment of the present invention.

FIG. 2 illustrates a block diagram of the signal transmission system with increased data speed in accordance with one embodiment of the present invention. As shown, similar parts of the system shown in FIG. 1 are similarly labeled in the embodiment illustrated in FIG. 2 for ease of reference.

As can be seen from FIG. 2, a network clock NCLK from the Central Office switch 101 is provided to the CTU 102 via a connection 201 such as a coupling, a link or a hard wire connection. In particular, as the discussed in further detail below, in accordance with one embodiment of the present invention, with the network clock NCLK from the Central Office switch 101, the A/D converter 108 in the CTU 102 is synchronized with the D/A converter 107 of the Central Office switch 101. Additionally, with the network clock NCLK from the Central Office switch 101, the D/A converter 109 in the RTU 104 is further synchronized with the D/A converter 107 in the Central Office switch 101.

For example, in one embodiment, the bit clock of the transmission line (in this case, a Digital Subscriber Line (DSL)) at a rate of 544 Kbps is synchronized to the D/A converter 107 clock in the Central Office switch 101 via a phase lock loop in the CTU 102. Then, the RTU 104 recovers the bit clock from the DSL signal and generates the required clocks necessary by the D/A converter 109 in a framer in the RTU 104.

With the single synchronization approach described above, signal transmission rate in a communication system can be effectively provide a rate higher than the 33.6 Kbps approaching closer to the 56 Kbps of the V0.90 modem 105 at the remote terminal connected to a user's home or office computer terminal (or other such equivalent equipment used at the user's end for access to the communication system).

As analog interfaces to the Central Office switch 101 are typically for POTS systems, there was previously no apparent need or functional reason to synchronize these POTS lines to the network clock NCLK. However, by providing synchronization between the D/A converter 107 in the Central Office switch 101 and the A/D converter 108 in the CTU 102 as well as the D/A converter 109 in the RTU 104 with the network clock NCLK, in accordance with the present invention, data transmission speed beyond the present limit of 33.6 Kbps can be achieved.

Figure 3:
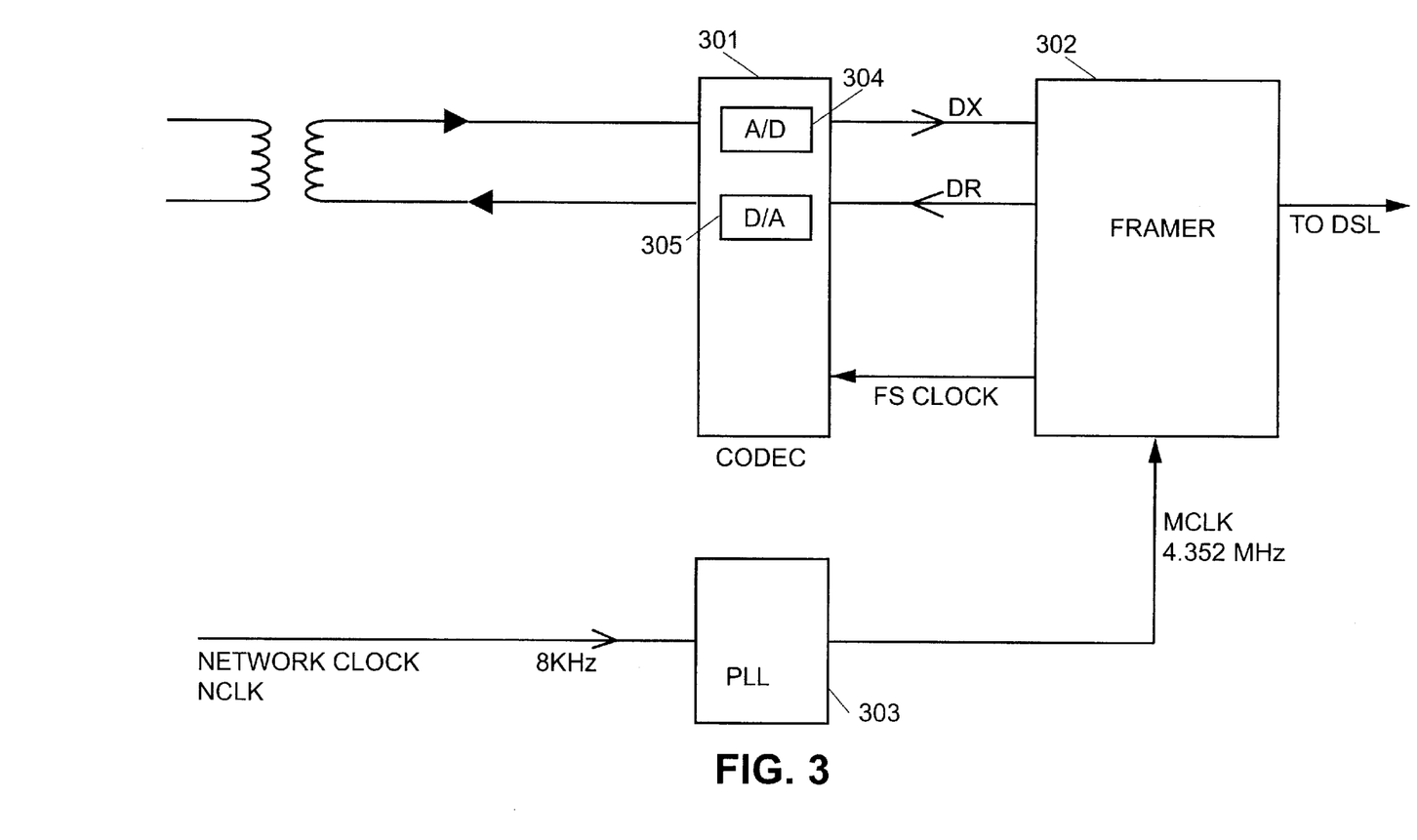
FIG. 3 illustrates a detailed view of the signal transmission system providing increased data speed with synchronization in accordance with one embodiment of the present invention.

FIG. 3 illustrates a detailed view of the signal transmission system providing increased data speed by clock synchronization in accordance with one embodiment of the present invention. As shown, there are provided a codec interface 301 including an A/D converter 304 and a D/A converter 305, and a framer 302 coupled to the codec interface 301. The codec interface 301 is configured to receive analog signals on the telephone interface side of the codec interface 301 (for example, from the Central Office switch 101) and digital signals from the framer 302. The codec interface 301 is further configured to transmit encoded digital bit stream $D_X$ (via the A/D converter 304) to the framer 302 and to receive digital bit stream $D_R$ from the framer 302 for decoding and transmission to the Central Office switch 101. When the framer 302 is ready to send or receive the 8-bit digital word to/from the codec interface 301, the framer 302 sends the codec strobe pulse signal FS to the codec interface 301.

When the framer 302 sends the codec strobe pulse signal FS to the codec interface 301, the framer 302 also transmits 8 bits of data to the codec interface 301 at the D/A converter 305 side via the lead configured for the transmission of the digital bit stream DR, and the 8 bits are clocked into a register before being provided to the D/A converter 305 in the codec interface 301 (i.e., a register, for example, for temporary storage). The data from the framer 302 is then clocked into and held in the register until the D/A converter 305 is ready to accept the data into its own register (or memory) where it can be then processed. At the same time, the 8 bits are clocked out of the A/D converter 304 portion of the codec interface 301 (i.e., the digital representation of the analog signal) to the framer 302 via the lead configured to transmit the digital bit stream $D_X$.

As shown in FIG. 3, the framer 302 is synchronized by way of a synchronization system clock MCLK operating at 4.352 MHz. In particular, the configuration illustrated in FIG. 3 shows a Phase Lock Loop (PLL) 303 which is configured to receive the network clock NCLK of 8 KHz which is available from the central office switch via the twisted copper pair. The PLL 303 is one similar to a commercially available PLL clock such as the MK 1547-XX MicroClock provided by ICS MicroClock of San Jose, Calif. The PLL 303 then generates the master clock MCLK at 4.352 MHz which is provided to the framer 302.

For example, as in this case, upon selection of a master clock MCLK at 4.352 MHz, an internal divider divides the master clock MCLK down to 8 KHz clock signals. The 8 KHz clock signal divided from the master clock MCLK is then compared to the 8 KHz network clock NCLK received from the Central Office switch 101. Then, the PLL 303 locks the phase of the master clock MCLK to the network clock NCLK received from the Central Office switch 101, thereby synchronizing the master clock MCLK to the network clock NCLK of the Central Office switch 101. Thus, by synchronizing the master clock MCLK provided to the CTU 102 to the network clock NCLK from the Central Office switch 101, the A/D converter 108 of the codec interface 301 in the CTU 102 can sample the incoming analog signal from the D/A converter 107 of the Central Office switch 101 at synchronized points on the waveform (i.e., quantization step) and reduce the amount of additional quantization noise introduced. In other words, with the A/D converter 108 in the codec interface 301 of the CTU 102 synchronized with the D/A converter 107 of the Central Office switch 101, introduction of additional quantization noise is reduced and an increase in the data throughput which results in higher speed signal transmission can be achieved.

In the manner discussed above, in accordance with the present invention, the A/D converter 108 in the CTU 102 is synchronized with the D/A converter 107 of the Central Office switch 101. With the synchronization, the analog signal from the D/A converter 107 can be re-encoded to a corresponding digital signal by the A/D converter 108 at the CTU 102 with the same encoded synchronization level as the original signal leaving the ISP network. Moreover, since the encoded signal also depends upon the level of the incoming analog signals to be encoded, the incoming analog signal level is adjusted to the signal level leaving the Central Office switch 101. Additionally, the phase of the recovered clock can be adjusted to achieve the highest possible data transmission speed.

As discussed above, the synchronization approach in accordance with the present invention allows the sampling clock (i.e., the master clock MCLK) to be recovered from the network clock NCLK from the Central Office switch 101 and used to sample the A/D converter in the CTU 102 to reduce the introduction of additional quantization noise if the network clock NCLK is available from the Central Office switch 101. Moreover, the signal phase can be adjusted, if necessary, to optimize the data speed.

Alternatively, if the network clock NCLK is not available for sampling, the sampling clock can be recovered by oversampling the incoming analog signal. A digital signal processor (DSP) or an equivalent can be used to oversample the signal, and then, a precise frequency can be recovered to sample the A/D converter in the Central Termination Unit. Since all POTS lines generally come from the same Central Office switch 101, only one DSP would be required to recover a clock on any one of the analog interfaces.

More specifically, since the D/A converter 107 in the Central Office switch 101 (i.e., the analog port interface) is clocked at a rate of 8 KHz, the analog waveform received by the A/D converter 108 in the CTU 102 generally has small steps on the waveform at the 8 KHz sampling rate. It can be generally assumed that these small steps on the waveform are approximately a few microseconds in duration, typically about 5 microseconds. For example, in the case where the DSP samples at a high rate such as one million samples per second, five samples corresponding to the above-referenced small steps result (i.e., 5 microseconds equal 5 samples at 1 million samples/second). Thus, by determining these periods where the samples are alike, the 8 KHz sampling clock can be recovered. With the synchronization approach discussed above, the recovered clock is equivalent to the network clock NCLK from the Central Office switch 101 with a rate of 8 KHz.

Figure 4:
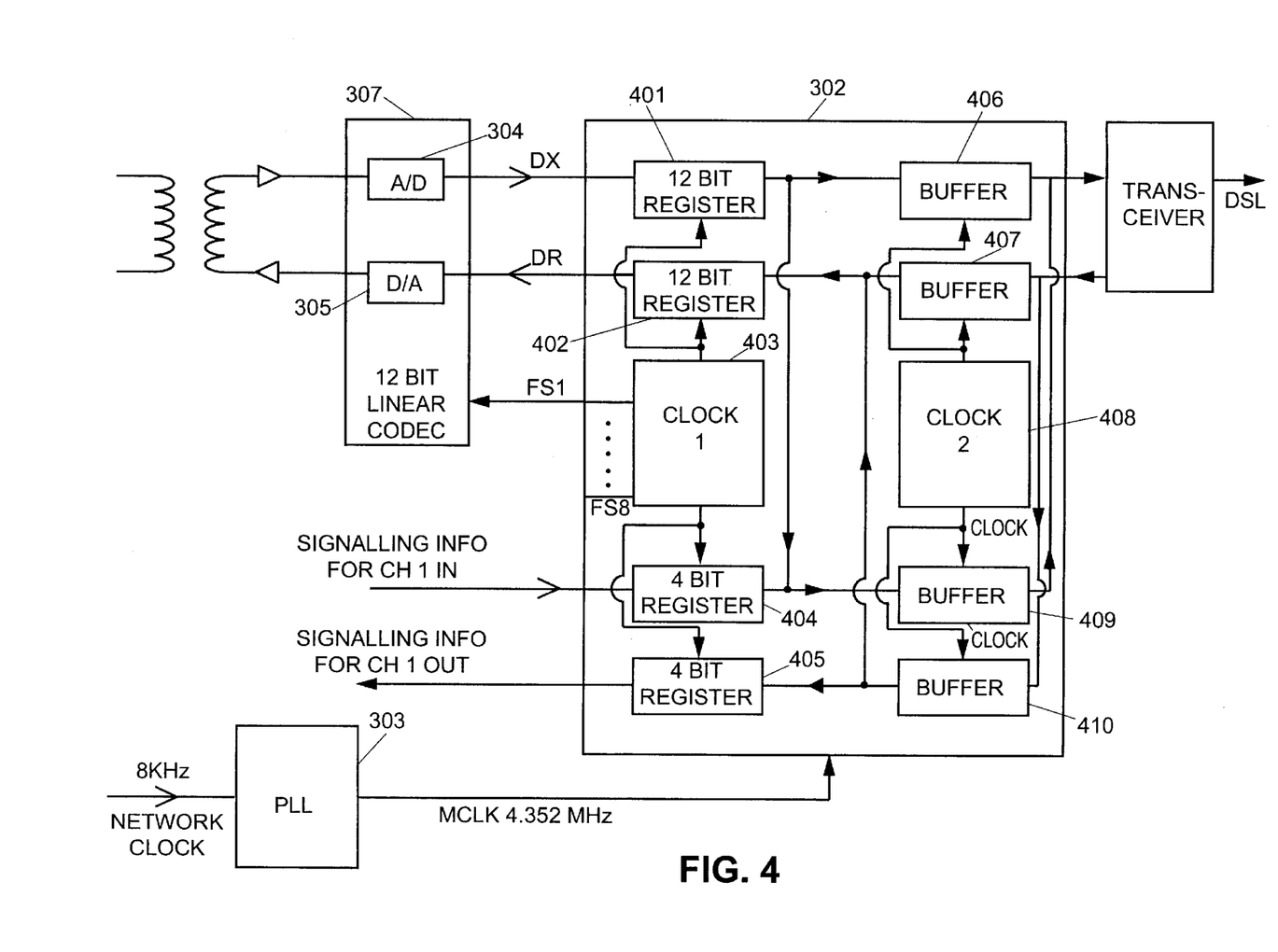
FIG. 4 illustrates a detailed view of the signal transmission system providing increased data speed with synchronization and bit robbing in accordance with one embodiment of the present invention.

FIG. 4 illustrates a signal transmission system providing increased data speed by synchronization with bit robbing technique in accordance with another embodiment of the present invention. It should be noted that similar parts shown in FIG. 4 as compared with those shown in FIG. 3 are labeled similarly, and accordingly, in similar fashion in the embodiment shown in FIG. 4, and thus are not operate repeated here.

As shown, the framer 302 of the signal transmission system shown in FIG. 4 is configured for synchronization for all system clocks including the master clock MCLK in the CTU 102 and a similar slave clock in the RTU 104 (not shown) to the network clock NCLK. Furthermore, the network clock NCLK is passed through the PLL 303 to obtain the synchronized 4.532 MHz master clock MCLK as discussed above. Accordingly, all other clock signals such as the A/D converter strobe, i.e., FS signal sent from clock 403 in the framer 302 to the codec interface 301 and so on used in the framer 302 is derived from the synchronized master clock MCLK.

In accordance with one embodiment of the present invention, the codec interface 301 is a 12-bit linear codec as shown in FIG. 4. As can be further seen, the framer 302 is provided with two, 12-bit registers 401, 402, configured to respectively receive and transmit digital data stream from the 12-bit codec 301. Also shown in FIG. 4 are two internal clocks 403, 408 and transmit buffer 406, receive buffer 407, and two overhead buffers 409, and 410. Additionally, the framer 302 is further provided with two 4-bit registers 404, 405.

When the incoming analog signal from the Central Office switch 101 (FIGS. 1 & 2) is to be sampled at the 12-bit linear codec 301, the codec strobe pulse FS from clock 403 of framer 302 is transmitted to the 12-bit linear codec 301 and activates the codec 301. The A/D converter 304 in the 12 bit linear codec 301 then converts the received analog signal into a corresponding 12-bit digital transmit data $D_X$ and transmits to the 12-bit register 401 in the framer 302. Furthermore, the D/A converter 305 in the 12-bit linear codec 301 is configured to receive a 12-bit digital receive data stream $D_R$ from 12-bit register 402 in the framer 302.

Since only 8 bits of data can be transmitted to transmit buffer 406 in the framer 302 to be sent down the transmission line via a transceiver in the transmit direction (downstream), the lower order 4 bits from the 12-bit digital transmit data stream $D_X$, which are not transmitted to the transmission buffer 406 are provided to overhead buffer 409, otherwise, these 4 bits would be lost. Similarly, in the receive direction, the 12-bit digital receive data stream $D_R$ received from the transmission line by the framer 302 can only provide 8 bits to the receive buffer 407. Therefore, the 4 bits of data which cannot be accommodated by the receive buffer 407 are provided to overhead buffer 410, otherwise, these 4 bits would be lost.

As can be further seen from FIG. 4, the 4-bit registers 404, 405 are configured to receive and transmit, respectively, 4-bit signaling data which indicate signaling state changes such as relays, LEDs, ringing and off-hook. In particular, in the transmit direction, in the case where there is a signaling state change, the 4-bit signaling data from signaling register 404 are provided to the overhead buffer 409. On the other hand, if there are no signaling state changes, the overhead buffer 409 remains empty. In this case, the 4 lower order bits from the 12-bit register 401, which previously were not able to be accommodated by the transmit buffer 406, are now provided to the overhead buffer 409, which, in turn, transmits the 4 lower order bits of the transmit data onto the transmission line.

More specifically, the 12 bits of data stream received from the 12-bit linear codec 301 is clocked into the 12-bit register 401. Since only 8 bits can be sent to transmit buffer 406, the extra 4 bits must be sent to overhead buffer 409 where it will be clocked into the overhead channel. If there is a transmit signaling state change recognized by a change in the bits in the 4-bit register 404, these 4 signaling bits are instead clocked into the overhead buffer 409 and sent in the overhead channel. As long as there is no signaling state change, however, the 4 data bits from the 12-bit register 401 is clocked into the buffer 409 and sent in the overhead channel.

The opposite of the above-described operation occurs in the receive direction. That is, the framer 302 receives a 12-bit digital data stream from the transmission line. However, the receive buffer 407 can only accommodate 8 of the 12 bits of the receive data. If there is a signaling state change, the 4 bits in the overhead buffer 410 of the framer 302 received from the transmission line is sent to the 4-bit register 405 to execute the indicated signaling. If there is no signaling state change, however, the 4 bit register 405 remains unchanged and the "robbed" bits that now occupy the overhead buffer 410 are clocked into the 12-bit register 402 along with the 8 bits of data stream from the receive buffer 407 to provide a 12 bit word. This procedure is continued until there is a signaling state change, in which case, instead of the 4 bits being clocked into the 12-bit register 402, it will be clocked into the 4-bit register 405.

In particular, with the two internal clocks 403, 408 in the framer 302 synchronized with the system clock MCLK by the PLL clock 303 as discussed above, the 4 lower order bits in the overhead buffer 409 and the 8 bits of transmit data from the transmit buffer 406 are multiplexed onto the transmission line, or in this case, onto the DSL bit stream in the transmit direction. Likewise, the 4 lower order bits in the overhead buffer 410 are clocked into the 12-bit register 402 along with the 8 bits of receive data from the receive buffer 407 in the receive direction to form the 12-bit digital receive data stream $D_R$.

Moreover, in this case, the signaling information is contained in the overhead channel (not the 64 Kbps channel for each of the eight channels). Thus, in the case of the signal transmission system of FIG. 4 at the CTU 102 side, for example, signaling from the RTU 104 is decided from the data stream and provided to buffer 410.

The overhead channel is 32 Kbps, and of this, the signaling portion is 16 Kbps. Of the 16 Kbps signaling portion, since there are 8 channels in the above-described system, 2 Kbps per channel provides the 12-bit word. For example, the is signaling overhead bit rate in one embodiment of the system described is 16 Kbps for each one of the eight channels with the transmission rate at 512 Kbps for each channel. If there are infrequent signaling state changes in the system, as is normally the case, the effective bit rate of each transmission channel is 66 Kbps (64 Kbps+2 Kbps). Moreover, in the case where the data rate is, for example, in the range of 35 to 40 Kbps, the signal transmission system in accordance with one embodiment of the present invention can be configured to have a data rate for each channel increased to a range of 37 to 42 Kbps.

As discussed above, the overall data transmission rate can be effectively increased by providing synchronization of the additional A/D converter with the incoming analog signal and using additional overhead bits in the DSL transport. In particular, overhead bits are used to send synchronization, signaling and status information to the far end of the transmission system (for example, to the Remote Terminal). Typically, these overhead bits are transmitted in an overhead channel and do not affect the normal data transmission channel.

The signaling channel continuously transmits the signaling status (for example, off-hook, on-hook, ringing, etc), but the far end only looks for a change in the signaling bits. Since four bits per channel are used for signaling, and since the change in signaling status occurs infrequently (for example, in a typical system, a change in the signaling status occurs typically when the channel is switched off-hook or on-hook), these four overhead bits can be used to transmit a higher resolution of encoded bits. Furthermore, since a telephone connection or call is connected in an off-hook state when sending and/or receiving data from the ISP, there would not be a change in the status during the remainder of the connection. Thus, during the time data is transmitted, the signaling status would not change, and the bits could be continuously used for data transmission. For example, if a 10 or a 12-bit linear encoder is used at either ends of the data transmission system, the normal 8-bits can be sent over the transmission channel which some of the additional, lower order bits can be sent over the now freed overhead channel.

The resulting increase in the available bits used to encode the analog signal allows a decrease in the quantization noise and an increase in the effective data transmission rate to above the theoretical limit. Furthermore, if other channels in the transmission system are idle, their signaling bits can also be used for the active channel, and thereby permits an adaptive type algorithm approach to increase the data transmission speed.

Additionally, another approach in accordance with the present invention uses an 8-bit $\mu$-law encoder, and then, uses the additional overhead bits to transmit error information to the far end. For instance, in a $\mu$-law codec, the signal is compressed such that small signals have less error than large signals since speech is generally lower in signal level (as compared to data level). By detecting a large signal (i.e., data levels), a signal could be send to the far end of the subscriber carrier loop such as the remote terminal unit instructing it to change its D/A converter characteristics to add more quantizing steps at the high level rather than at the low level parts of the signal.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A communication system, comprising:
   a codec interface for encoding an analog signal to generate an encoded digital signal;
   a clock configured to receive a network clock signal from a central office switch and to generate a master clock signal, wherein the master clock signal is synchronized to the network clock signal; and
   a framer coupled to the codec interface for receiving the encoded digital signal, and coupled to the clock for receiving the synchronized master clock signal, wherein the framer further includes:
   a first register for storing the encoded digital signal;
   a second register for storing signaling information;
   a transmit buffer for temporarily storing a first portion of the encoded digital signal;
   an overhead buffer for temporarily storing either a second portion of the encoded digital signal or the signaling information; and
   a framer clock for synchronizing the first and second registers, the transmit buffer and the overhead buffer to the synchronized master clock signal;
   wherein when there is no signaling information change in the second register, the first portion of the encoded digital signal is multiplexed with the second portion of the encoded digital signal, and further, when there is signaling information change in the second register, the first portion of the encoded digital signal is multiplexed with the signaling information.

2. The system of claim 1 wherein the codec interface is configured to encode the analog signal in accordance with the synchronized master clock signal.

3. The system of claim 1 wherein the framer clock is synchronized to the network clock signal.

4. The system of claim 1 wherein the first register is a 12-bit register and further, wherein the second register is a 4-bit register.

5. The system of claim 1 wherein the signaling information change occurs when there is one or more change in the ringing status, on-hook status and off-hook status.

6. The system of claim 1 wherein the codec interface includes an analog-to digital converter for sampling the analog signal in accordance with the synchronized master clock signal to generate the digital signal such that the analog-to-digital converter is configured to sample the analog signal in synchronization with the network clock signal.

7. The system of claim 6 wherein the central office switch includes a digital-to-analog converter for decoding digital signals in accordance with the network clock signal.

8. The system of claim 7 wherein the digital-to-analog converter of the central office switch and the analog-to-digital converter of the codec interface are configured to respectively decode and encode in synchronization with the network clock signal.

9. The system of claim 6 wherein the digital signal from the analog-to-digital converter is an 8-bit data.

10. The system of claim 1 wherein the clock is a phase lock loop (PLL) clock.

11. The system of claim 1 wherein the clock is configured to lock the frequency and phase of the master clock signal to the network clock signal.

12. The system of claim 1 wherein the network clock signal has a frequency of 8 KHz.

13. The system of claim 1 wherein the master clock signal has a frequency of 4.352 MHz.

14. The system of claim 1 wherein the codec interface includes a 12-bit linear codec.

15. A method of providing a communication system, comprising the steps of:

encoding an analog signal and generating an encoded digital signal; receiving a network clock signal and generating a master clock signal, wherein the master clock signal is synchronized to the network clock signal;

latching the encoded digital signal in a first register;

latching signaling information in a second register;

temporarily storing a first portion of the encoded digital signal in a first buffer; temporarily storing either a second portion of the encoded digital signal or the signaling information in a second buffer;

synchronizing the first and second registers and the first and second buffers with the synchronized master clock signal;

wherein when there is no signaling information change in the second register, multiplexing the first portion of the encoded digital signal with the second portion of the encoded digital signal, and further, when there is signaling information change in the second register, multiplexing the first portion of the encoded digital signal with the signaling information.

16. The method of claim 15 wherein the step of encoding the analog signal includes the step of encoding the analog signal in accordance with the synchronized master clock signal.

17. The method of claim 15 wherein the signaling information change occurs when there is one or more change in the ringing status, on-hook status and off-hook status.

18. The method of claim 15 wherein the step of encoding includes the steps of sampling the analog signal in accordance with the synchronized master clock signal and generating the digital signal such that the digital signal is generated in synchronization with the network clock signal.

19. The method of claim 15 wherein step of generating the master clock includes the step of locking the frequency and phase of the master clock signal to the network clock signal.

20. The method of claim 15 wherein the network clock signal has a frequency of 8 KHz.

21. The method of claim 15 wherein the master clock signal has a frequency of 4.352 MHz.

* * * * *